United States Patent
Ebner

(10) Patent No.: US 9,493,169 B2
(45) Date of Patent: Nov. 15, 2016

(54) METHOD AND CONTROL SYSTEM FOR OPERATING A MOTOR VEHICLE

(71) Applicant: AUDI AG, Ingolstadt (DE)

(72) Inventor: André Ebner, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 14/412,213

(22) PCT Filed: Jul. 8, 2013

(86) PCT No.: PCT/EP2013/002001
§ 371 (c)(1),
(2) Date: Dec. 31, 2014

(87) PCT Pub. No.: WO2014/005722
PCT Pub. Date: Jan. 9, 2014

(65) Prior Publication Data
US 2015/0336588 A1    Nov. 26, 2015

(30) Foreign Application Priority Data
Jul. 6, 2012    (DE) .................. 10 2012 013 503

(51) Int. Cl.
*G01C 21/36* (2006.01)
*B60R 16/037* (2006.01)
(Continued)

(52) U.S. Cl.
CPC .......... *B60W 50/10* (2013.01); *B60H 1/00642* (2013.01); *B60R 16/037* (2013.01);
(Continued)

(58) Field of Classification Search
CPC .......... G01C 21/3629; G01C 21/3664; G06F 3/017; B60H 1/00642; B60W 50/10; B60W 2420/42; B60W 2600/00; B60K 2350/1052; B60R 16/037; G02B 2027/0187; G02B 2027/0138; G60K 9/00355
See application file for complete search history.

(56) References Cited

U.S. PATENT DOCUMENTS 6,498,970 B2 * 12/2002 Colmenarez ........ B60R 25/2045
                                                                  382/116
6,545,670 B1 * 4/2003 Pryor .................... G06F 3/0425
                                                                  345/156
(Continued)

FOREIGN PATENT DOCUMENTS

CN    101802886 A    8/2010
CN    102308185 A    1/2012
(Continued)

OTHER PUBLICATIONS

Cheng et al, Vision-Based Infotainment User Determination by Hand Recognition for Driver Assistance, IEEE Transactions on Intelligent Transportation Systems, vol. 10, No. 3, 2010, pp. 759-764.*

(Continued)

*Primary Examiner* — Russell Frejd
(74) *Attorney, Agent, or Firm* — Staas & Halsey LLP

(57) ABSTRACT

A method and control system for operating a motor vehicle, sense a gesture directed at an object from a vehicle occupant using a gesture recognition unit, interpret the gesture and identify of the object using a data processing unit and generate a corresponding control command on the basis of the interpreted gesture and the identified object. An assistance system of the motor vehicle is actuated in accordance with the control command using the data processing unit. A voice command, uttered by the vehicle occupant is sensed before, during or after the sensing of the gesture, using a voice recognition unit. A combined interpretation of the gesture, the identified object and the voice command is performed, and the control command is generated on the basis of the combined interpretation, using the data processing unit.

18 Claims, 2 Drawing Sheets

(51) Int. Cl.
  *G06F 3/01* (2006.01)
  *G06F 17/20* (2006.01)
  *B60H 1/00* (2006.01)
  *B60W 50/10* (2012.01)
  *G06K 9/00* (2006.01)
  *G05B 13/02* (2006.01)
  *G10L 15/22* (2006.01)

(52) U.S. Cl.
  CPC ....... *G01C21/3629* (2013.01); *G01C 21/3664* (2013.01); *G06F 3/017* (2013.01); *G06F 17/20* (2013.01); *G06K 9/00355* (2013.01); *B60K 2350/1052* (2013.01); *B60W 2420/42* (2013.01); *B60W 2600/00* (2013.01); *G05B 13/0265* (2013.01); *G06F 2203/0381* (2013.01); *G10L 2015/227* (2013.01)

(56) References Cited

U.S. PATENT DOCUMENTS

| | | | | |
|---|---|---|---|---|
| 6,614,422 | B1* | 9/2003 | Rafii | G06F 1/1626 345/156 |
| 6,710,770 | B2* | 3/2004 | Tomasi | G06F 1/1613 345/156 |
| 7,489,303 | B1* | 2/2009 | Pryor | B60K 35/00 345/173 |
| 7,527,288 | B2* | 5/2009 | Breed | B60R 21/013 280/735 |
| 7,920,102 | B2* | 4/2011 | Breed | B60K 35/00 340/991 |
| 8,296,151 | B2* | 10/2012 | Klein | G06F 3/017 382/181 |
| 9,092,394 | B2* | 7/2015 | Dokor | G06F 17/20 |
| 2002/0152010 | A1 | 10/2002 | Colmenarez et al. | |
| 2005/0134117 | A1* | 6/2005 | Ito | B60R 16/0373 307/10.1 |
| 2006/0004486 | A1* | 1/2006 | Yoshikawa | B60W 50/14 700/245 |
| 2008/0059199 | A1* | 3/2008 | Hataoka | G01C 21/36 704/275 |
| 2008/0211779 | A1* | 9/2008 | Pryor | G01C 21/3664 345/173 |
| 2009/0319166 | A1 | 12/2009 | Khosravy et al. | |
| 2010/0182137 | A1* | 7/2010 | Pryor | G01C 21/3664 340/425.5 |
| 2010/0228612 | A1 | 9/2010 | Khosravy et al. | |
| 2010/0274480 | A1 | 10/2010 | McCall et al. | |
| 2011/0022393 | A1 | 1/2011 | Wäller et al. | |
| 2011/0037725 | A1* | 2/2011 | Pryor | G01C 21/3664 345/174 |
| 2011/0202862 | A1* | 8/2011 | Kramer | B60K 35/00 715/771 |
| 2011/0225532 | A1 | 9/2011 | Isert et al. | |
| 2012/0176410 | A1 | 7/2012 | Meier et al. | |

FOREIGN PATENT DOCUMENTS

| | | |
|---|---|---|
| DE | 102008051756 | 9/2010 |
| DE | 102009037835 | 2/2011 |
| DE | 102010002741 | 9/2011 |
| DE | 102012013503.3 | 7/2012 |
| DE | 202012005255 | 8/2012 |
| EP | 2339297 | 6/2011 |
| WO | 2009/118183 | 10/2009 |
| WO | PCT/EP2013/002001 | 7/2013 |

OTHER PUBLICATIONS

Martin Randelhoff, "Linked Telematics solution with Augmented Reality—AIDA 2.0," Published Sep. 1, 2011, 15 pages, www.zukunft-mobilitaet.net/5086/strassenverkehr/aida2-navigation-mit-vw-audi-3d/.
English Language Copy of International Search Report for PCT/EP2013/002001, mailed Oct. 4, 2013, 4 pages.
German Office Action for German Priority Patent Application No. 10 2012 013 503.3, issued Mar. 25, 2013, 5 pages.
German Office Action for German Priority Patent Application No. 10 2012 013 503.3, issued Jun. 25, 2014, 8 pages.
WIPO English language translation of International Preliminary Report on Patentability mailed Jan. 15, 2015 for corresponding International Patent Application No. PCT/EP2013/002001, 7 pages.
Chinese Office Action dated May 23, 2016 in corresponding Chinese Patent Application No. 201380035025.9.

* cited by examiner

METHOD AND CONTROL SYSTEM FOR OPERATING A MOTOR VEHICLE

CROSS REFERENCE TO RELATED APPLICATIONS

This application is based on and hereby claims priority to International Application No. PCT/EP2013/002001 filed on Jul. 8, 2013 and German Application No. 10 2012 013 503.3 filed on Jul. 6, 2012, the contents of which are hereby incorporated by reference.

BACKGROUND

The invention relates to a method for operating a motor vehicle. Furthermore, the invention relates to a control system for operating a motor vehicle.

A method and control system of this type are known from US 2010/0274480 A1. The method comprises: sensing of a gesture directed at an object from a vehicle occupant by a gesture recognition unit; interpretation of the gesture and identification of the object by a data processing unit; generation of a corresponding control command on the basis of the interpreted gesture and the identified object and actuation of an assistance system of the motor vehicle in accordance with the control command by the data processing unit. The system disclosed therein is used to recognize gestures from a vehicle occupant that the vehicle occupant uses to point to what are known as "points of interest", after which an appropriate piece of information about the point of interest is output to the vehicle occupant.

DE 10 2008 051 756 A1 discloses a method in which a vehicle occupant can point to a point of interest on a display of a motor vehicle, after which the presentation of the display is adjusted as appropriate.

The article "AIDA 2.0—Intelligente Navigationslösung mit Augmented Reality verknüpft" [AIDA 2.0—Intelligent navigation solution combined with augmented reality] (http://www.zukunft-mobilitaet.net/5086/strassenverkehr/aida2-navigation-mit-vw-audi-3d/) discloses a control system for operating a motor vehicle that can be controlled by gesture control. A 3D map not only shows road features but also reveals information in the form of "augmented reality". Thus, the data for more than a million mobile radios are used to depict current road conditions and to display 20 000 points of interest, ratings for restaurants and shopping options, information about local events and the like. Furthermore, the system shown therein can also be used to control other functions of the vehicle, such as an air conditioning installation, a radio and the like. The control is effected by gestures or by pointing a finger at appropriate objects.

Finally, DE 10 2010 002 741 A1 shows an information system for a motor vehicle that can be used to provide personalized information having an appropriate local reference about objects situated in an environment of the motor vehicle. By way of example, corresponding supplementary information can be displayed when approaching an object, such as a hotel or the like.

SUMMARY

One possible object is to provide a method and a control system for operating a motor vehicle that allows simplified and less error-prone operator control of a motor vehicle.

The inventor proposes a method for operating a motor vehicle, which comprises:

sensing of a gesture directed at an object from a vehicle occupant by a gesture recognition unit;
interpretation of the gesture and identification of the object by a data processing unit;
generation of a corresponding control command on the basis of the interpreted gesture and the identified object and actuation of an assistance system of the motor vehicle in accordance with the control command by the data processing unit;
wherein the proposed method is distinguished by the following:
sensing of a voice command, uttered by the vehicle occupant before, during or after the sensing of the gesture, by a voice recognition unit;
combined interpretation of the gesture, the identified object and the voice command and generation of the control command on the basis of the combined interpretation by the data processing unit.

In other words, the method thus provides for combined gesture and voice control to be provided that can be used to control the motor vehicle or appropriate functions of the motor vehicle. By way of example, the vehicle occupant can point to appropriate objects with which he wishes to interact and, substantially simultaneously, can issue an appropriate voice command that reveals in what form he wishes to interact with the relevant object. By way of example, these objects may be what are known as points of interest that are located along a particular route, for example, that is taken with the motor vehicle. Similarly, the objects may alternatively be operator control elements, such as an air conditioning installation operator control element, a navigation device inside the motor vehicle or the like, with which the vehicle occupant can interact by appropriately pointing a finger or by another gesture in combination with a corresponding voice command.

The operator control of the motor vehicle or of appropriate assistance systems of the motor vehicle becomes much more intuitive by virtue of the combined gesture and voice control and is thus simplified. Furthermore, misinterpretations of requests from the vehicle occupant for interaction with the objects are substantially reduced, since appropriate gestures from the vehicle occupant and his voice commands are interpreted in combination.

According to one advantageous embodiment, both a gesture directed at an object arranged outside the motor vehicle and a gesture directed at an object arranged inside the motor vehicle prompt said gesture to be sensed and interpreted and the object to be identified. In other words, the combined gesture and voice control can be applied to objects both inside and outside the vehicle.

In a further advantageous embodiment, the gesture sensed is a finger movement from the vehicle occupant that is used to point to the object. Alternatively, further gestures from the vehicle occupant can also be sensed that can be checked for consistency with a database, for example, that stores respective meanings of appropriate gestures, so that even more intuitive operator control of the motor vehicle or of the assistance system thereof is made possible.

In a further advantageous refinement, for the purpose of identifying the object, a motor vehicle position and a motor vehicle orientation are ascertained and then the object is identified by a comparison with digital map information. This allows appropriate objects to be identified in a particularly simple manner, since knowledge of the motor vehicle position in combination with the knowledge of the motor vehicle orientation allows a correspondingly simple association to be made with appropriate digital map information, which means that no further complex sensor system is required for identifying appropriate objects, particularly objects arranged outside the motor vehicle.

Preferably, combined gesture and voice command recognition with subsequent generation of the control command is effected only if the gesture and the voice command are sensed within a prescribed period. This ensures that an appropriate control command is performed exclusively after combined evaluation of a gesture and a corresponding voice command, so that a request from a vehicle occupant can be interpreted particularly reliably. In other words, misinterpretation of the request from the vehicle occupant for interaction with an appropriate object is reliably prevented.

In a further advantageous refinement, a gesture directed at a further motor vehicle is sensed and identified and, in combination with an interpreted voice command that is used to request setup of a communication link to a communication device of the further motor vehicle, a communication device of the assistance system is actuated with an appropriate control command for setting up the communication link. The communication link may be a chat function, a telephone call or the like, for example. Hence, it is a particularly simple matter to set up a communication link to a further motor vehicle from the surroundings without the need for the vehicle occupant to dial a number, for example.

According to a further advantageous embodiment, a gesture directed at an object arranged outside the motor vehicle is sensed and interpreted and, in combination with a voice command interpreted as an information request, a navigation unit of the assistance system is actuated with a control command for providing a piece of information about the object. This object may be what is known as a point of interest, for example in the form of a hotel, a restaurant or the like, so that combined evaluation of a gesture and a voice command from the vehicle occupant allows a corresponding piece of information to be provided for the vehicle occupant.

In a further advantageous embodiment, a gesture directed at an object arranged outside the motor vehicle is sensed and interpreted and, in combination with a voice command identified as a navigation command, a navigation unit of the assistance system is actuated with an appropriate control command for ascertaining a route to the object. Complex inputs on a navigation unit for determining an appropriate route to the desired object can therefore be dispensed with, which means that appropriate navigation functions can be requested and provided by the vehicle occupant in a particularly simple manner.

In a further advantageous refinement, an object arranged outside the motor vehicle is highlighted in a contact-analogous head-up display of the motor vehicle as soon as a gesture directed at this object has been recognized. This allows particularly simple interaction by the vehicle occupant with appropriate objects in the environment of the motor vehicle. At the same time, the vehicle occupant is provided with immediate visualization of which object he has selected with his gesture, so that in the event of misinterpretation of the gesture this error is directly evident to the vehicle occupant.

The inventor also proposes a control system for operating a motor vehicle comprises a gesture recognition unit that is designed to recognize a gesture directed at an object from a vehicle occupant; a data processing unit that is designed to interpret the sensed gesture, to identify the object and to generate at least one control command on the basis of the interpreted gesture and the identified object and to actuate an assistance system of the motor vehicle in accordance with the control command, wherein the control system is distinguished in that the control system comprises a voice recognition unit that is designed to sense a voice command uttered by the vehicle occupant before, during or after the sensing of the gesture; and in that the data processing unit is designed to interpret the gesture and the voice command in combination and to generate the control command on the basis of the combined interpretation of the gesture and the voice command. Advantageous embodiments of the method can be regarded as advantageous embodiments of the control system, and in this case particularly the control system comprises means that can be used to carry out the method.

An advantageous embodiment of the control system is distinguished in that the gesture recognition unit is designed to monitor exclusively a prescribable interior area of the motor vehicle and to sense the gestures from the vehicle occupant who is arranged in this interior area. In other words, exclusively the gestures from a particular vehicle occupant are sensed and, in combination with the voice commands from said vehicle occupant, converted into appropriate control commands. This ensures that a plurality of vehicle occupants cannot simultaneously output different gestures and corresponding voice commands, for example, which would result in contradictory control commands or different control commands.

Further advantages, features and details can be found in the description below of preferred exemplary embodiments and with reference to the drawing. The features and combinations of features cited in the description above and the features and combinations of features cited in the description of the figures below and/or shown in the figures alone can be used not only in the respectively indicated combination but also in other combinations or on their own without departing from the scope of the disclosure.

BRIEF DESCRIPTION OF THE DRAWINGS

These and other objects and advantages of the present invention will become more apparent and more readily appreciated from the following description of the preferred embodiments, taken in conjunction with the accompanying drawings of which.

DETAILED DESCRIPTION OF THE PREFERRED EMBODIMENT

Figure 1:
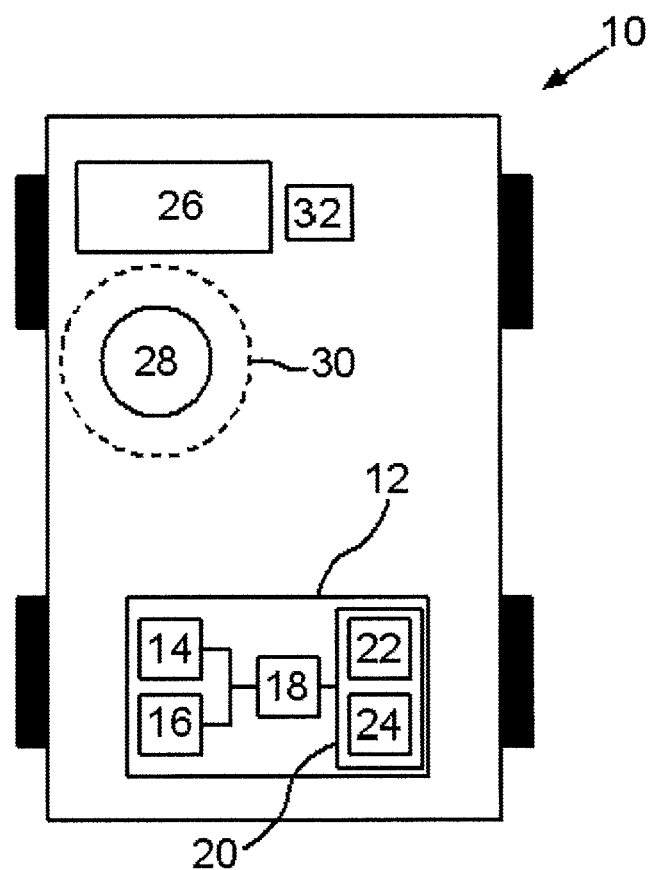
FIG. 1 shows a schematic illustration of a motor vehicle with a control system for operating the motor vehicle, with a contact-analogous head-up display, with an object inside the motor vehicle and with a vehicle occupant arranged inside an interior area of the motor vehicle.

Reference will now be made in detail to the preferred embodiments of the present invention, examples of which are illustrated in the accompanying drawings, wherein like reference numerals refer to like elements throughout.

A schematic illustration of a motor vehicle 10 is shown in FIG. 1. The motor vehicle 10 comprises a control system 12 having a gesture recognition unit 14, a voice recognition unit 16, a data processing unit 18 and an assistance system 20 that comprises a navigation unit 22 and a communication device 24. In addition, the motor vehicle 10 comprises a contact-analogous head-up display 26 that can be used, by way of example, to provide projections in the area of a windshield—not shown here—of the motor vehicle 10 for a vehicle occupant 28 who is sitting inside an interior area 30 of the motor vehicle 10. Finally, the motor vehicle 10 also comprises an object 32 that is arranged in the interior of the motor vehicle 10. By way of example, the object 32 may be an operator control element, an automatic air conditioning system, a display or the like. In this case, the object 32 may likewise be part of the assistance system 20, so that the object 32 can be actuated by the data processing device 18 by appropriate control commands.

The gesture recognition unit 14 is designed to recognize a gesture from the vehicle occupant 28 that is directed at the object 32 or at a further object, not denoted in more detail here, inside the motor vehicle 10 or outside the motor vehicle 10. In addition, the gesture recognition unit 14 is designed to monitor exclusively the interior area 30 of the motor vehicle 10 and to sense the gestures from the vehicle occupant 28 who is arranged in this interior area 30. In this case, the interior area 30 to be monitored may comprise an area around a driver's seat in the motor vehicle or other seats inside the motor vehicle 10, for example. For the purpose of recognizing appropriate gestures from the vehicle occupant 28, the gesture recognition unit 14 may have a camera, for example, which is not shown here and by which appropriate movements or gestures from the vehicle occupant 28 can be sensed. By way of example, the gestures from the vehicle occupant 28 that are directed at appropriate objects 32 or further objects may be pointing of a finger, another hand movement or the like that are sensed by the gesture recognition unit 14.

The voice recognition unit 16 is designed to sense a voice command uttered by the vehicle occupant 28 before, during or after the sensing of the gesture. To this end, the voice recognition unit 16 can use a separate, separate microphone, not shown here, for example, or else a microphone that is already installed in the motor vehicle 10 for a hands-free installation of the motor vehicle 10, for example. In this case, the voice recognition unit 16 can also be used to sense voice commands from further vehicle occupants, not shown here, of the motor vehicle 10.

The gesture recognition unit 14 and the voice recognition unit 16 are connected to the data processing unit 18, so that the appropriately sensed gestures or voice commands can be forwarded to the data processing unit 18. The data processing unit 18 is designed to interpret the sensed gesture, to identify the object 32 or further objects to which the gesture has been used to point, and to interpret appropriate voice commands from the vehicle occupant 28. Furthermore, the data processing unit 18 is designed to interpret the gesture, the identified object and the voice command in combination and to generate an appropriate control command on the basis of the combined interpretation and to actuate the assistance system 20 in accordance with the control command. A method for operating the motor vehicle 10 using the control system 12 is explained below.

Figure 2:
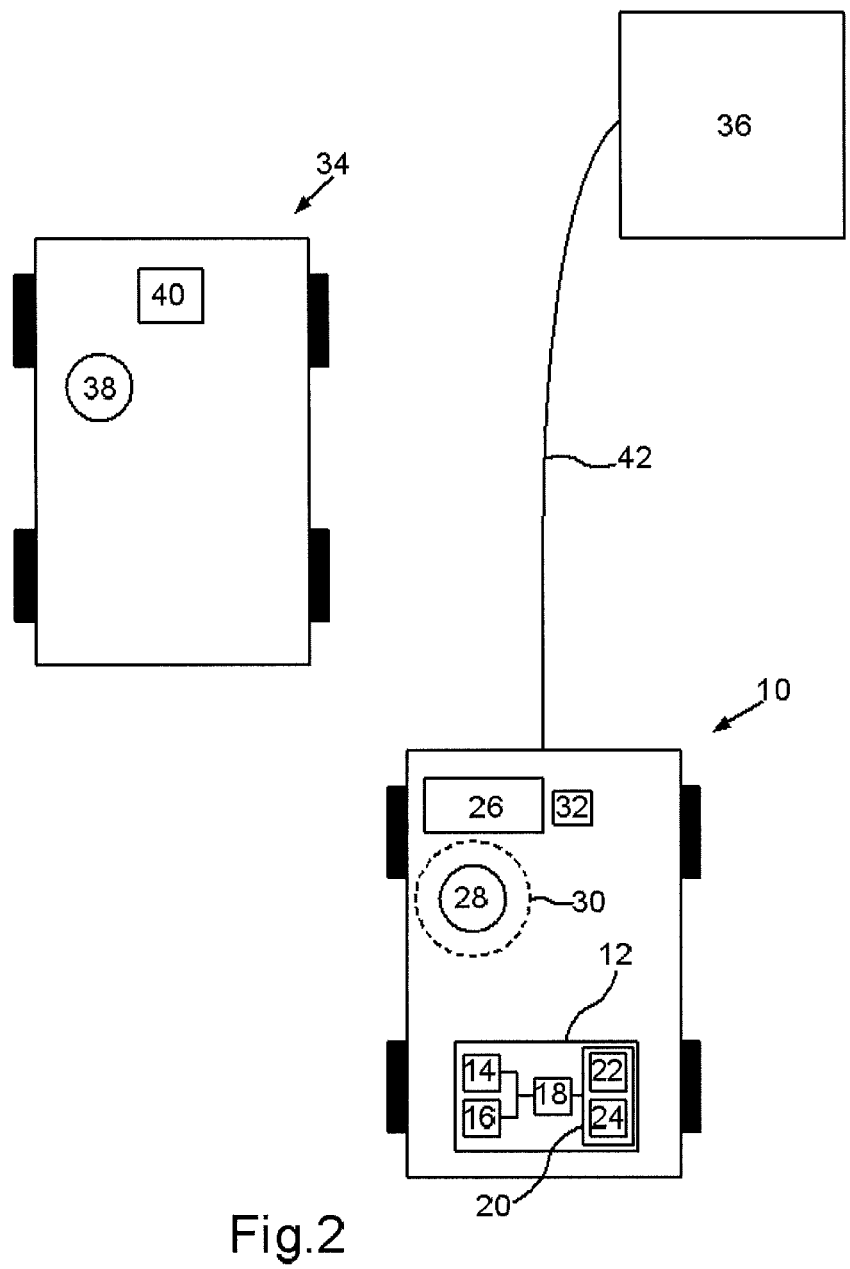
FIG. 2 shows a schematic illustration of the motor vehicle shown in FIG. 1 and of a further motor vehicle and an object arranged outside the motor vehicle shown in FIG. 1.

FIG. 2 shows a schematic view of the motor vehicle 10, a further motor vehicle 34 and a further object 36. By way of example, the object 36 may be what is known as a point of interest in the form of a hotel, a restaurant or the like. First of all, the vehicle occupant 28 wishes to interact with the object 32 inside the motor vehicle 10. In the present case, the object 32 is an automatic air conditioning system control unit, and the vehicle occupant 28 wishes to raise the room temperature inside the motor vehicle 10. First of all, the vehicle occupant 28 uses his index finger to point to the object 32 and issues a voice command "raise interior temperature by 2° C.".

The gesture recognition unit 14 recognizes this pointing of the finger in the direction of the object 32 and at the same time the voice recognition unit 16 senses the voice command issued by the vehicle occupant 28. This information is forwarded to the data processing unit 18, which firstly interprets the pointing of the finger of the vehicle occupant 28 in the direction of the object 32 and uses this to identify the object 32, that is to say in the present case the automatic air conditioning system control unit. Furthermore, the data processing unit 18 interprets the voice command from the vehicle occupant 28, as a result of which the data processing unit 18 recognizes that the interior temperature inside the motor vehicle 10 needs to be raised by 2° C. In other words, the gesture, the identified object 32 and the voice command are thus interpreted in combination by the data processing unit 18, after which an appropriate control command is generated on the basis of the combined interpretation by the data processing unit 18.

The data processing unit 18 then actuates the object 32 with the control command as appropriate. As a result, the room temperature inside the motor vehicle 10 is finally raised by the desired 2° C., or an automatic air conditioning system, not denoted in more detail here, of the motor vehicle 10 is actuated such that the room temperature inside the motor vehicle 10 is raised as desired. In this case, the object 32 may essentially be any objects inside the motor vehicle 10 with which interaction between the vehicle occupant 28 for operating or operator control of the motor vehicle 10 or the functions thereof is possible.

In addition, the vehicle occupant 28 may also desire setup of a communication link to the further motor vehicle 34 or to a vehicle occupant 38 who is driving the motor vehicle 34. In other words, a communication link needs to be set up between the communication device 24 of the motor vehicle 10 and a communication device 40 of the further motor vehicle 34. To this end, the vehicle occupant 28 points to the vehicle 34 traveling ahead and, shortly before, at the same time or shortly after, issues an appropriate voice command, for example "set up telephone call to this motor vehicle".

The gesture recognition unit 14 first of all senses the gesture from the vehicle occupant 28 that is directed at the motor vehicle 34. In order to be able to recognize in the first place that the vehicle occupant 28 has pointed to the motor vehicle 34, recognition of the gesture is first of all followed by the ascertainment of a motor vehicle position and a motor vehicle orientation. By way of example, this can be accomplished using the navigation unit 22, which is used to provide appropriate GPS information. Furthermore, the motor vehicle 10 may comprise a compass or the like, for example, that can be used to ascertain the orientation of the motor vehicle 10. Moreover, it is also possible to use odometry data, such as distances covered and/or accelerations by the motor vehicle 10, for position finding.

In order to recognize that the motor vehicle 34 is involved, the control system 12 or the gesture recognition unit 14 may be connected to a camera, not shown here, or a plurality of cameras that are mounted on the motor vehicle 10, which camera or cameras is/are used to recognize that the vehicle occupant 28 has just pointed to the further motor vehicle 34. The data processing unit 18 then evaluates the recognized gesture, the voice command and the identification of the further motor vehicle 34, after which an appropriate control command for setting up a communication link between the communication device 24 of the motor vehicle 10 and the communication device 40 of the further motor vehicle 34 is generated. The vehicle occupant 28 can then communicate with the vehicle occupant 38.

The control system 12 can also be used to output information about appropriate objects outside the motor vehicle 10, in the present case about the object 36. In the present case, the object 36 is a hotel that is in the visual range of the vehicle occupant 28. The vehicle occupant 28 points to the object 36 and simultaneously issues a voice command: "How expensive are rooms in this hotel?".

To identify the object 36, the motor vehicle position and the motor vehicle orientation are again ascertained and then the object 36 is identified by a comparison with an environment model, for example by a comparison with digital map information. The data processing unit 18 again evaluates the gesture, the identified object 36 and the appropriate voice command, after which the data processing unit 18 outputs an appropriate control command to the navigation unit 22, which then outputs the desired price information to the vehicle occupant 28. Alternatively, the appropriate control command can also be output to the communication device 24, which sets up an Internet connection, for example, in order to look for the appropriate information and to make it available to the vehicle occupant 28.

Furthermore, it is also possible for the vehicle occupant 28 to desire navigation to the object 36. In combination with an appropriate pointing of a finger or another gesture in the direction of the object 36 and a voice command in the form of a navigation command, this information is evaluated by the control system 12, again in combination, so that the data processing unit 18 forwards an appropriate control command to the navigation unit 22 in order to actuate the latter as appropriate, so that the navigation unit 22 calculates a route 42 to the object 36, along which route the vehicle occupant 28 is navigated until the object 36 is reached.

To simplify the operator control of the control system 12, objects 36 arranged outside the motor vehicle 10 or further objects can in this case be highlighted in the contact-analogous head-up display 26 as soon as a gesture directed at this object 36 has been recognized. This provides the vehicle occupant 28 with appropriate support, so that interactions between the vehicle occupant 28 and such objects 36 are additionally facilitated.

Furthermore, the combined gesture and voice command recognition with the subsequent generation of the control command is effected only if the gesture and the voice command are sensed within a prescribed period. In other words, provision may be made for the control system 12 to generate appropriate control commands only if an appropriate gesture and an appropriate voice command from the vehicle occupant 28 occur within a prescribed time window. This improves the interpretation of requests from the vehicle occupant 28, since combined evaluation of gestures and voice commands always takes place.

Overall, the control system 12 allows particularly simple and intuitive interaction between the vehicle occupant 28 and appropriate objects 32 and 36, so that a vehicle occupant 28 can use a wide variety of functionalities of the motor vehicle 10 in a particularly simple manner without being distracted too much from his actual driving tasks. Besides simplified operator control of the motor vehicle 10, this additionally substantially improves safety when the motor vehicle 10 is driven in road traffic.

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in *Superguide v. DIRECTV,* 69 USPQ2d 1865 (Fed. Cir. 2004).

The invention claimed is:

1. A method for operating a motor vehicle, comprising:
sensing a gesture of a vehicle occupant, the gesture being a finger pointing toward an object, the gesture being sensed by a gesture recognition unit;
interpreting the gesture and identifying the object, using a data processing unit;
sensing a voice command using a voice recognition unit, the voice command being uttered by the vehicle occupant before, during or after the gesture is sensed;
using the data processing unit to perform a combined interpretation of the gesture, the object and the voice command and to generate a control command based on the combined interpretation; and
using the data processing unit to actuate an assistance system of the motor vehicle in accordance with the control command,
wherein
both a gesture directed at an outside object arranged outside the motor vehicle and a gesture directed at an inside object arranged inside the motor vehicle prompt sensing of the gesture, interpreting the gesture and identifying the object.

2. The method as claimed in claim 1, wherein
for identifying the object, a motor vehicle position and a motor vehicle orientation are ascertained and then the object is identified by a comparison with digital map information.

3. The method as claimed in claim 1, wherein
the gesture is directed at the outside object arranged outside the motor vehicle, and
for identifying the object, a motor vehicle position and a motor vehicle orientation are ascertained and then the object is identified by a comparison with digital map information.

4. The method as claimed in claim 1, wherein
the gesture is directed at the outside object arranged outside the motor vehicle, and
for identifying the object, an exterior camera is mounted on the motor vehicle.

5. The method as claimed in claim 1, wherein
combined interpretation of the gesture, the object and the voice command to generate the control command is performed only if the gesture and the voice command are sensed within a prescribed period.

6. The method as claimed in claim 1, wherein
the gesture is a gesture directed at a further motor vehicle,
the voice command is a request to setup a communication link to a communication device of the further motor vehicle,
the gesture is sensed and interpreted in combination with the voice command, and
the control command actuates a communication device of the assistance system to set up the communication link.

7. The method as claimed in claim 6, wherein
the further motor vehicle is highlighted in a contact-analogous head-up display as soon as the gesture has been recognized.

8. The method as claimed in claim 6, wherein
the communication link comprises a chat function or a telephone call.

9. The method as claimed in claim 1, wherein
the gesture is directed at the outside object arranged outside the motor vehicle,
the voice command is an information request,
the gesture is sensed and interpreted in combination with the voice command, and the control command actuates a navigation unit of the assistance system to provide a piece of information about the outside object.

10. The method as claimed in claim 1, wherein the gesture is directed at the outside object arranged outside the motor vehicle, the voice command is a navigation command, the gesture is sensed and interpreted in combination with the voice command, and the control command actuates a navigation unit of the assistance system to ascertain a route to the outside object.

11. The method as claimed in claim 10, wherein the outside object is highlighted in a contact-analogous head-up display as soon as the gesture has been recognized.

12. The method as claimed in claim 1, wherein the gesture is directed at the outside object arranged outside the motor vehicle, and the object is highlighted in a contact-analogous head-up display of the motor vehicle as soon as the gesture has been recognized.

13. The method as claimed in claim 1, wherein the gesture is directed at an air conditioning system, and the voice command specifies a setting change for the air conditioning system.

14. The method as claimed in claim 1, wherein the gesture recognition unit identifies the object, and the voice recognition unit identifies how the object should be actuated.

15. The method as claimed in claim 1, wherein the gesture recognition unit is a camera that senses movements or gestures of the vehicle occupant.

16. The method as claimed in claim 1, wherein the gesture is directed at the outside object arranged outside the motor vehicle, the voice command is an information request, the gesture is sensed and interpreted in combination with the voice command, and the control command is output to a communication device of the assistance system which accesses information related to the information request through an internet connection, and the information accessed using the internet connection is provided to the vehicle occupant.

17. A control system for operating a motor vehicle, comprising:

a gesture recognition unit to recognize a gesture of a vehicle occupant, the gesture being a finger pointing directed at an object;

a voice recognition unit to sense a voice command uttered by the vehicle occupant before, during or after the gesture is recognized; and a data processing unit to interpret the gesture, to identify the object, to perform a combined interpretation of the gesture, the object and the voice command, to generate a control command based on the combined interpretation and to actuate an assistance system of the motor vehicle in accordance with the control command, wherein the gesture recognition unit recognizes both an outside gesture directed at an object arranged outside the motor vehicle and an inside gesture directed at an object arranged inside the motor vehicle, so that the data processing unit interprets the gesture and identifies the object.

18. The control system as claimed in claim 17, wherein the gesture recognition unit monitors exclusively a prescribed interior area of the motor vehicle to sense only gestures from a particularly located vehicle occupant arranged in the prescribed interior area.

\* \* \* \* \*